(12) United States Patent
Karlapudi et al.

(10) Patent No.: US 11,144,570 B2
(45) Date of Patent: Oct. 12, 2021

(54) DATA INGESTION BY DISTRIBUTED-COMPUTING SYSTEMS

(71) Applicant: VMware, Inc., Palo Alto, CA (US)

(72) Inventors: Sai Samrat Karlapudi, San Mateo, CA (US); Mirza Mohsin Beg, Foster City, CA (US)

(73) Assignee: VMware, Inc., Palo Alto, CA (US)

( * ) Notice: Subject to any disclaimer, the term of this patent is extended or adjusted under 35 U.S.C. 154(b) by 479 days.

(21) Appl. No.: 15/881,396

(22) Filed: Jan. 26, 2018

(65) Prior Publication Data
US 2019/0236197 A1  Aug. 1, 2019

(51) Int. Cl.
*G06F 16/27* (2019.01)
*G06F 11/14* (2006.01)
*G06F 9/455* (2018.01)

(52) U.S. Cl.
CPC .......... *G06F 16/27* (2019.01); *G06F 9/45558* (2013.01); *G06F 11/1464* (2013.01); *G06F 2009/4557* (2013.01); *G06F 2009/45595* (2013.01); *G06F 2201/805* (2013.01)

(58) Field of Classification Search
None
See application file for complete search history.

(56) References Cited

U.S. PATENT DOCUMENTS

| | | | | |
|---|---|---|---|---|
| 5,060,150 A * | 10/1991 | Simor | ..................... | H04L 29/00 719/313 |
| 7,215,970 B2 * | 5/2007 | Corrigan | ........... | H04L 29/12066 455/412.1 |
| 7,444,679 B2 * | 10/2008 | Tarquini | .............. | H04L 63/0218 726/23 |
| 7,953,571 B2 * | 5/2011 | Odaka | ..................... | H04L 41/06 702/127 |
| 8,768,962 B2 * | 7/2014 | Laron | ................. | G06F 16/1873 707/781 |
| 9,712,887 B2 * | 7/2017 | Myers | ................. | H04N 21/8456 |
| 9,717,011 B2 * | 7/2017 | Huang | .................. | H04L 41/069 |
| 10,044,578 B2 * | 8/2018 | He | ....................... | H04L 41/0681 |
| 10,445,479 B2 * | 10/2019 | Rao | ......................... | H04L 67/18 |

* cited by examiner

*Primary Examiner* — Kim T Nguyen
(74) *Attorney, Agent, or Firm* — Dentons US LLP (57) ABSTRACT

Techniques for data ingestion by a distributed-computing system are provided. In one embodiment, data received from one or more data sources is processed at a management node of the distributed-computing system. The data is generated by one or more components of an information processing system external to the distributed-computing system. The data is stored at the management plane. The management plane selects, from a plurality of data cores, a data core to ingest the data. The plurality of data cores are stored across one or more data plane containers of a data plane of the distributed-computing system. The management plane processes the data to generate one or more event records corresponding to the data. The one or more event records are sent to the selected data core, which causes the data plane to store the one or more event records in the selected data core.

21 Claims, 3 Drawing Sheets

DATA INGESTION BY DISTRIBUTED-COMPUTING SYSTEMS

FIELD

The present disclosure relates generally to distributed-computing systems and, more specifically, to data ingestion by distributed-computing systems.

BACKGROUND

Modern distributed information systems are increasingly complex and can include thousands of host computing devices, virtual machines (VMs), and networking components that service a large number of clients. Components of these systems produce massive volumes of machine-generated log data (application logs, network traces, configuration files, messages, performance data, system state dumps, etc.). Log data provides valuable information to system administrators as they manage these complex systems. For example, log data can be useful in troubleshooting, discovering trends, detecting security problems, and measuring performance. However, individual logs can be difficult for a user to interpret and analyze efficiently.

In practice, unstructured and structured log data is aggregated or ingested from multiple sources, stored, and studied within an analytic framework to provide operational value. Typically, software agents running on or within various system components aggregate log data as it is generated and periodically request ingestion of that data from an underlying data platform. However, this process of ingesting log data can result in data loss when the underlying data platform becomes unavailable after an ingestion request has been sent or while the request is being processed. The data platform can become unavailable at any moment for various reasons (e.g., schema failures, hardware upgrades, ingestion traffic, etc.).

Data loss undercuts the principle benefit of log analytics, namely improvements in operational visibility and faster troubleshooting across physical, virtual and cloud environments. As the size and complexity of information systems continue to grow, the increasing volume of log data only exacerbates the need for a more reliable and scalable technique for managing the ingestion log data.

SUMMARY

Techniques for data ingestion by a distributed-computing system are described herein. In one embodiment, data received from one or more data sources is processed at a management node of the distributed-computing system. The data is generated by one or more components of an information processing system external to the distributed-computing system. The data is stored at the management plane. The management plane selects, from a plurality of data cores, a data core to ingest the data. The plurality of data cores are stored across one or more data plane containers of a data plane of the distributed-computing system. The management plane processes the data to generate one or more event records corresponding to the data. The one or more event records are provided to the selected data core, which causes the data plane to store the one or more event records in the selected data core.

DETAILED DESCRIPTION

The following description sets forth exemplary methods, systems, and the like. It should be recognized, however, that such description is not intended as a limitation on the scope of the present disclosure, but is instead provided as a description of exemplary embodiments.

As described above, information processing systems (e.g., distributed information systems) generate large amounts of log data. Using data ingestion processes, the log data is transferred to a remote data platform, which organizes and stores the log data in a manner that facilitates analysis and troubleshooting. The remote data platform is implemented, for example, on a distributed-computing system. The data ingestion process is typically initiated by software agents running on or within the information processing systems. For example, the software agents send ingestion requests to the data platform to initiate transfer of accompanying log data to the data platform. Occasionally, the ingestion process is interrupted as a result of communication errors or failures in one or more components of the data platform. In conventional systems, these interruptions can result in undesirable data loss because the software agents are not capable of reinitiating the failed data ingestion process. Techniques for enabling reliable data ingestion by data platforms are thus desirable.

Various techniques for data ingestion by a distributed-computing system are described herein. The techniques can reduce the likelihood of data loss during data ingestion when a failure event is encountered. In some embodiments, data is received at a management node of the distributed-computing system. The data is generated by one or more components of an information processing system external to the distributed-computing system. The received data is stored at the management plane. In some embodiments, the data is replicated and stored across multiple management nodes of the management plane. The management plane selects, from a plurality of data cores, a data core to ingest the data. The plurality of data cores are stored across one or more data plane containers of a data plane of the distributed-computing system. The management plane processes the data to generate one or more event records corresponding to the data. The one or more event records are sent to the selected data core, which causes the data plane to store the one or more event records in the selected data core. As should be appreciated, storing the received data at the management plane prior to transferring the data to the data plane enables the management plane to reinitiate data ingestion in the event of a failure event. This reduces the likelihood of data loss and improves the reliability of the data ingestion process.

Moreover, storing the received data at the management plane enables the management plane to provide, with less delay, a confirmation to the software agent indicating that the data has been successfully received. In particular, during data ingestion, the received data is extracted, transformed, routed, and indexed, which can require a significant amount time to complete. Rather than waiting for the data ingestion process to complete (e.g., extracting, transforming, routing, and indexing the data) before providing a confirmation, the management plane can provide the software agent with the confirmation once the data is stored in the management plane. This enables the software agent to more quickly proceed with initiating a subsequent data ingestion request without having to wait for the ingestion process of the current data to be completed.

Figure 1A:
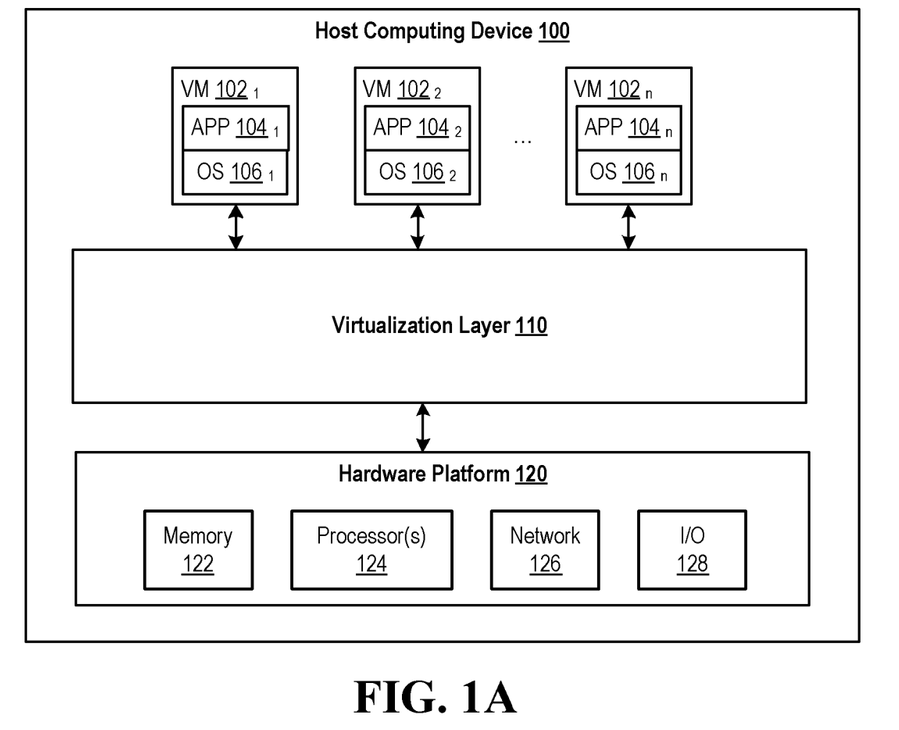
FIG. 1A is a block diagram illustrating a system and environment for implementing various components of a distributed-computing system, according to some embodiments.

FIG. 1A is a block diagram illustrating a system and environment for implementing various components of a distributed-computing system, according to some embodiments. As shown, virtual machines (VMs) $102_1$, $102_2$ ... $120_n$ are instantiated on host computing device 100. In some embodiments, host computing device 100 implements one or more elements of a distributed-computing system (e.g., distributed-computing system 200, described below with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g., a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

Figure 1B:
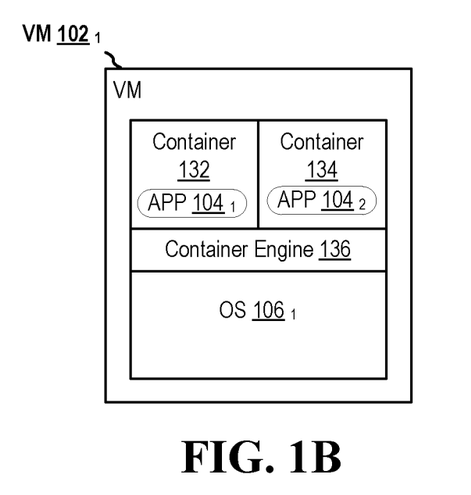
FIG. 1B is a block diagram illustrating a containerized application framework for implementing various components of a distributed-computing system, according to some embodiments.

FIG. 1B is a block diagram illustrating a containerized application framework for implementing various components of a distributed-computing system, according to some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (e.g., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system).

It should be appreciated that applications (Apps) implementing aspects of the present invention are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
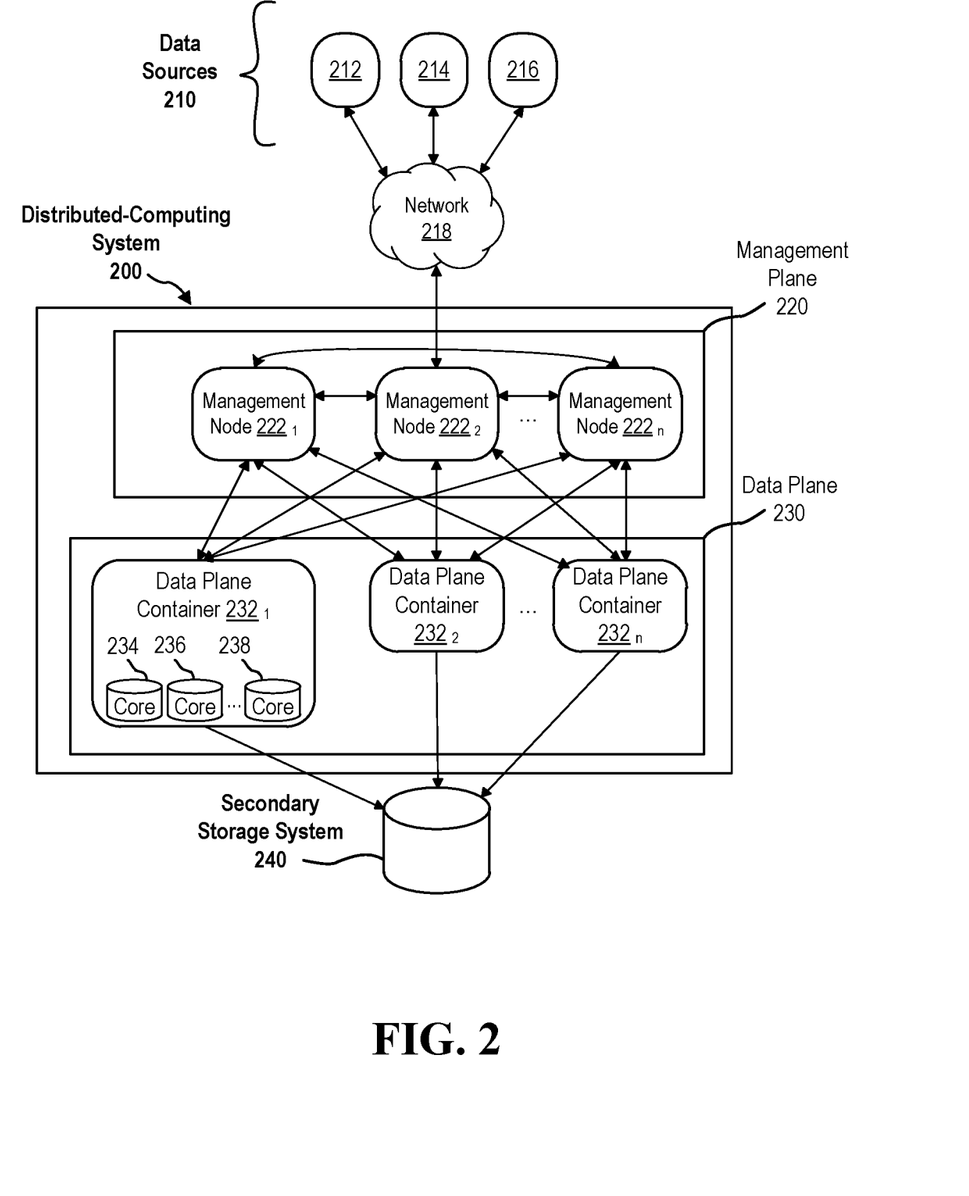
FIG. 2 is a block diagram illustrating systems and environment for data ingestion by a distributed-computing system, according to some embodiments.

FIG. 2 illustrates systems and environment for data ingestion by distributed-computing system 200, according to some embodiments. As shown, data sources 210 are coupled to distributed-computing system 200 through one or more communication networks 218. In particular, data sources 210 communicate with management plane 220 of distributed-computing system 200 via communication networks 218. In some embodiments, additional hardware and software components facilitate the transmission of data between data sources 210 and management plane 220. For example, data can pass through a proxy server or load balancer before arriving at management nodes 222 within management plane 220.

In some embodiments, data sources 210 include components which generate or provide data (e.g., log data) that is ingested into distributed-computing system 200. For example, data sources 210 include one or more information processing systems having servers 212, 214, and 216. Servers 212, 214, and 216 are located, for example, at one or more customer sites and generate data during operation. In some implementations, a software agent running on one or more servers (e.g., servers 212, 214, and 216) collects data and facilitates its transmission via communications network 218 to management plane 220, where it is routed to a particular storage location within data plane 230. As part of this process, the agent sends an ingestion request to management plane 220 along with data it has collected from an associated data source 210 and receives a confirmation from management plane 220 upon successful ingestion.

Examples of communication network(s) 218 include local area networks (LAN) and wide area networks (WAN), e.g., the Internet. Communication network(s) 218 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. Further, it is appreciated that, in some embodiments, physical communication networks, such as described above, are also implemented as a software defined network (SDN) or through software emulation.

Distributed-computing system 200 includes management plane 220 and data plane 230. The terms "management plane" and "data plane" refer to functional descriptions of elements of distributed-computing system 200 that perform specialized functions. Management plane 220 implements all business and management logic which allow an administrator to configure distributed-computing system 200, including data plane functionality. For example, management plane 220 is configured to perform management functions, such as process user queries, persist user configurations, and execute operational tasks on management nodes 222 and data plane containers 232. Management plane 220 is also configured to, for example, perform tasks related to input validation, user management, policy management, and background task tracking. In some embodiments, management plane 220 implements packet switching, filtering, tagging, routing logic, and the like. In some embodiments, management plane 220 provides a single API entry point to distributed-computing system 200.

Management plane 220 includes one or more management nodes 222. Each management node 222 is an instantiation of management software (e.g., an application) which implements management functionality. Management node 222 runs on a dedicated physical host, as an application within a virtual machine, within a software container on a dedicated host, within a software container on a virtual machine, or any combination thereof. Each management node 222 is communicatively coupled to one another and to data plane 230 via a communication interface(s) such as those described with respect to communications network 218. In some embodiments, each of the plurality of management nodes 222 independently implement management functionality for data plane 230. This redundancy improves reliability. For example, in situations where a management node (e.g., $222_1$) experiences a failure, another management node (e.g., $222_2$) can takeover to maintain management functionality.

Data plane 230 is coupled to management plane 220. Data plane 230 is configured to perform data processing functionality. For example, data plane 230 is configured to index data during data ingestion and store the indexed data. In some embodiments, data plane 230 is configured to ingest data received from management plane 220 and query stored data. Data plane 230 includes a collection of data plane containers 232. Each data plane container is an instance of a software application implementing data processing functionality within a container (e.g., container 132). In some embodiments, data plane containers 232 run on a dedicated host or within a virtualized environment such as VM $102_1$ on host computing device 100. Each data plane container 232 is associated with one or more data cores (e.g., cores 234, 236, and 238). A data core is an allocation of storage resources for files associated with a single tenant or customer. In some embodiments, a core spans one or more storage medias such as hard disks, solid state drives, virtual storage area network devices (VSANs), or the like. In some embodiments, each data core includes a database index with configuration, such as schema, caching, and the like. For example, each data core includes a set of memory structures that manages database files.

Data plane 230 is further coupled to secondary storage system 240 via communication interface(s), such as those described with respect to communications network 218. Data plane containers 232 communicate with secondary storage system 240 and are configured to transfer data to and retrieve data from secondary storage system 240. Secondary storage system 240 is configured to provide additional data storage functions such as backing up data located on data plane containers 232 or serving as long-term storage for infrequently accessed data. In some embodiments, secondary storage system 240 includes one or more storage media such as hard disks, solid state drives, virtual storage area network devices (VSANs), or the like.

Although in the present embodiment, distributed-computing system 200 includes management plane 220 and data plane 230, it should be recognized that, in other embodiments, distributed-computing system 200 can include additional functional layers. For example, distributed-computing system 200 can include additional software layers (e.g., applications) that facilitate functions related to providing alerts or notifications. In some embodiments, distributed-computing system 200 includes additional intermediate software layers for handling ingestion request or user queries.

Figure 3:
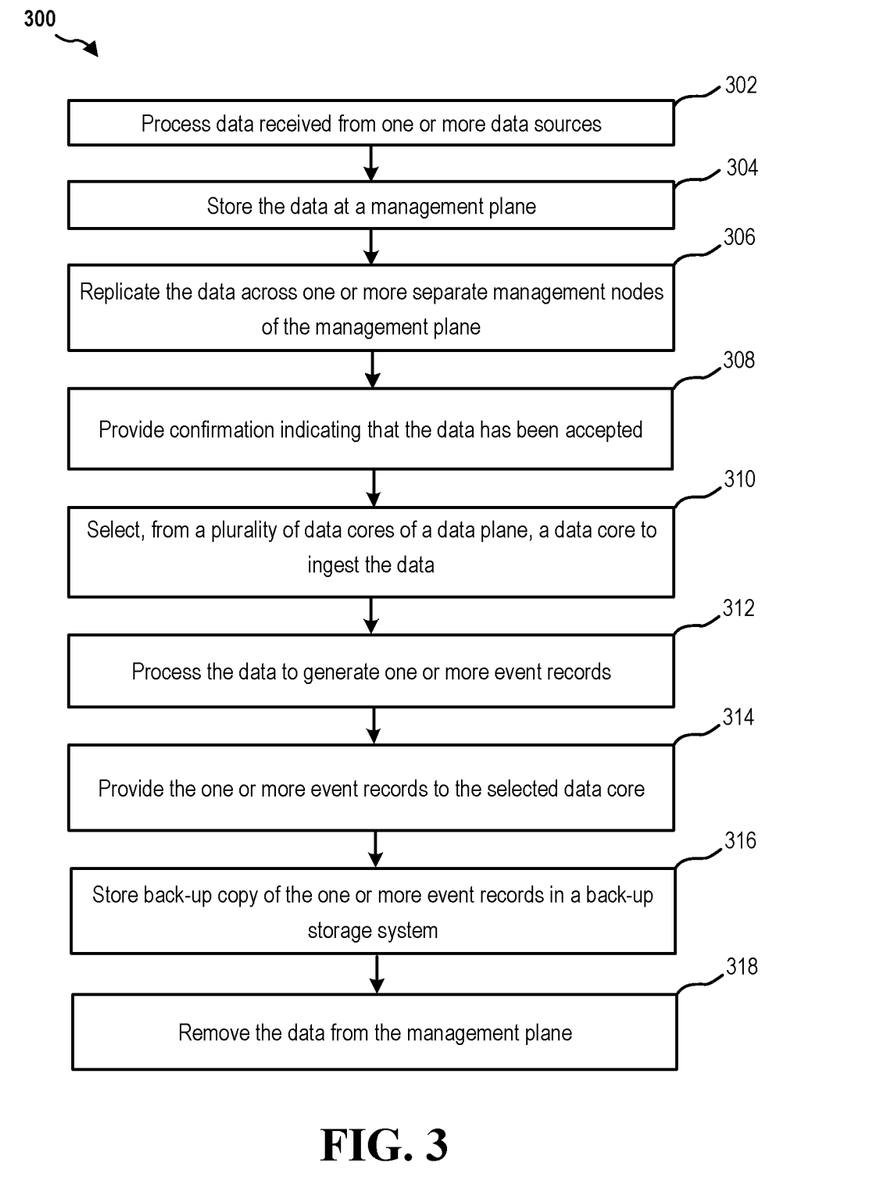
FIG. 3 illustrates a process for data ingestion by a distributed-computing system, according to some embodiments.

FIG. 3 illustrates a flowchart of exemplary process 300 for data ingestion by a distributed-computing system. Process 300 is performed, for example, using a distributed-computing system (e.g., distributed-computing system 200). In some embodiments, the distributed-computing system comprises a plurality of host computing devices (e.g., host computing device 100) that are communicatively coupled together in a network. In some embodiments, the distributed-computing system is implemented by one or more virtual machines (VM 102). The distributed-computing system implements, for example, a management plane (e.g., management plane 220) and a data plane (e.g., data plane 230). In some embodiments, the operations of process 300 are distributed across the various components (e.g., management plane, data plane, etc.) of the distributed-computing system. In process 300, some blocks are, optionally, combined, the order of some blocks is, optionally, changed, and some blocks are, optionally, omitted. In some embodiments, additional operations may be performed in combination with process 300.

At block 302, data received from one or more data sources (e.g., data sources 210) is processed at a management plane (e.g., management plane 220) of a distributed-computing system. In some embodiments, the data is associated with an ingestion request from the one or more data sources external to the distributed-computing system. For example, the ingestion request is processed at the management plane with an associated payload that includes the data. In some embodiments, the data is generated by one or more components of an information processing system external to the distributed-computing system. The information processing system is, for example, a second distributed-computing system. In some embodiments, the data from the one or more data sources includes log data representing one or more log events at the information processing system. The log data includes timestamps indicating the time at which each log event occurred at the information processing system. In some examples, each log event includes an event message, which contains structured and/or unstructured information regarding an operational status or error of the information processing system. The information can be used, for example, to detect and ameliorate various types of operational problems, hardware-design deficiencies, and/or software-design deficiencies of the information processing system.

In some examples, the one or more data sources from which the data is obtained includes an agent of the information processing system. The agent is, for example, an application installed on the information processing system. The agent is configured to capture data (e.g., log data) generated by the information processing system and to communicate with the distributed-computing system to coordinate ingestion of the data. For example, the agent provides an ingestion request with payload data to the management plane to process and waits for a confirmation from the management plane indicating that the data has been successfully processed. In some embodiments, the agent is not configured to perform a recovery process if a failure occurs during processing of the ingestion request. For example, the agent is not configured to automatically reinitiate the ingestion request if the management plane fails to successfully process the ingestion request.

At block 304, the data of block 302 is stored at the management plane. For example, the management plane processes the ingestion request by automatically storing the payload data of the ingestion request in memory allocated to the management plane. For example, the data is stored in the memory of a management node (e.g., management node 222) of the management plane. In some embodiments, the data is stored using persistent storage (e.g., non-volatile) of the management plane. Storing the data at the management plane can be desirable to reduce the likelihood of data loss during a failure event. For example, if data transfer between the management plane and a data plane of the distributed-computing system is interrupted, the management plane is able to reinitiate the ingestion process using the stored copy of the data at the management plane.

At block 306, the data is replicated across one or more separate management nodes of the management plane. In particular, the data is replicated and a copy of the replicated data is stored in the memory (e.g., persistent storage) of each separate management node of the one or more separate management nodes. In this way, multiple management nodes store the data received from the one or more data sources, thereby providing redundancy and reducing the likelihood of data loss. For example, if one management node of the management plane were to fail during processing of the ingestion request, then another management node storing the data can reinitiate the ingestion process.

At block 308, a confirmation is provided by the management plane to the one or more data sources. The confirmation indicates that the data has been accepted by the distributed-computing system. In some embodiments, the confirmation is provided upon replicating the data across the one or more separate management containers (block 310). In some embodiments, the confirmation is provided while the management plane is still processing the ingestion request. For example, the confirmation is sent prior to or while the one or more event records are being generated and stored in the selected data core (blocks 312 and 314).

In some embodiments, the confirmation is provided by the management plane to the agent of the information processing system. In particular, the agent waits for the confirmation upon providing the current ingestion request to the management plane. In some embodiments, the agent does not provide a subsequent ingestion request until the confirmation is received from the management plane for the current ingestion request. Providing the confirmation to the agent thus enables the agent to provide a subsequent ingestion request while the management plane is still processing the data from the current ingestion request. For example, upon receiving the confirmation from the management plane, the agent provides a second ingestion request with second payload data to the management plane for processing. This can facilitate parallel processing and thus increase the rate at which ingestion requests are processed by the distributed-computing system.

At block 310, a data core is selected from a plurality of data cores (e.g., data cores 234, 236, and 238) of the data plane (e.g., data plane 230). In particular, the data core is selected by the management plane to ingest the data received from the one or more data sources. In some embodiments, the plurality of data cores are distributed across a plurality of data plane containers (e.g., data plane container 232) of the data plane.

In some embodiments, the data core is selected using information included in the received ingestion request. For example, the ingestion request includes metadata indicating a tenant associated with the data or indicating a type of information contained in the data. In this example, a data core that is assigned to the tenant or to the type of information is selected.

In some embodiments, the data core is selected using metadata obtained from the data plane. In particular, the data plane periodically provides metadata to the management plane regarding the operating status of the plurality of data plane containers and the plurality of data cores. The obtained metadata from the data plane is stored, for example, at the management plane. The information includes, for example, the current available storage capacity of each data core, the current availability of each data core for ingestion, the ingestion processing capacity for each data plane container, or any combination thereof. In some embodiments, the current storage capacity of a data core represents the remaining amount of storage available in the data core. For example, if the maximum storage limit of a data core is 100 Gigabytes (GB) and the data core is half-full, then the available storage capacity of the data core is 50 GB. In some embodiments, the current availability of a data core represents whether the data core is available to ingest additional data. For example, a data core that is down or offline for maintenance is indicated in the metadata as not being available for data ingestion. In some embodiments, the ingestion processing capacity of a data plane container represents the current available bandwidth of the data plane container to handle additional ingestion requests. For example, a data plane container that is processing 100 ingestion requests per unit time has less ingestion processing bandwidth than another data plane container that is processing 50 ingestion requests per unit time. Similarly, a data plane container that is ingesting data at a rate of 5 GB per second has less ingestion processing capacity than another data plane container that is ingesting data at a rate of 1 GB per second. The metadata provided by the data plane enables the management plane to determine the current operating status of each data plane container and each data core of the data plane. In some embodiments, based on the current operating status, the management plane selects a data core in a manner that balances the ingestion load across the plurality of data plane containers and/or plurality of data cores. For example, using the metadata from the data plane, the management plane selects a data core that is currently available for ingestion and/or has a large amount of available storage capacity.

In some embodiments, the management plane determines, using the metadata, a current ingestion rate of each data plane container relative to other data plane containers of the data plane. The data core is selected based on the determined current ingestion rate of each data plane container relative to the other data plane containers. For example, the selected data core is stored in a data plane container that has a current ingestion rate that is lower than any of the other data plane containers in the data plane.

At block 312, the data received from the one or more data sources is processed to generate one or more event records corresponding to the data. In some embodiments, the data is in a compressed format and processing the data includes decompressing the data. In some embodiments, processing the data includes parsing the data (or the decompressed data) into the one or more event records. Each event record corresponds to a log event that occurred at the information processing system. For example, each event record includes a respective event message. The parsing processing is performed according to predetermined parsing rules. By applying the predetermined parsing rules, one or more fields or labels are extracted from the data for each event record. For example, the parsing processing extracts a timestamp for each event record.

In some embodiments, with reference back to block 306, replicating the data across the one or more separate management nodes includes replicating the one or more generated events across the one or more separate management nodes. In this way, multiple copies of the one or more event records persist across multiple management nodes, which reduce the likelihood of data loss during an ingestion failure event.

At block 314, the one or more event records are sent to the selected data core. Specifically, the management plane provides the one or more event records to the respective data plane container containing the selected data core. In some embodiments, providing the one or more event records includes providing ingestion instructions with the one or more event records to the respective data plane container for processing. The ingestion instructions include instructions for the respective data plane container to store the one or more event records in the selected data core. Accordingly, providing the one or more event records causes the respective data plane container to store the one or more event records in the selected data core. In particular, the data plane container stores the one or more extracted fields or labels in an index of the selected data core. The index enables the one or more event records to be quickly identified and located based on the one or more extracted fields or labels. For example, each event record is stored in the selected data core in association with a respective timestamp. Each timestamp is stored in the index of the selected data core and is mapped to its respective event record.

In some embodiments, an error is encountered during the providing of the one or more event records to the data plane for storage. The error causes the data plane to fail to store the one or more events in the selected data core. The data plane communicates the failure to the management plane and, in response, the management plane reinitiates ingestion of the data. The reinitiating is possible because the management plane stores one or more copies (blocks 304 and 306) of the data received from the one or more data sources. This reduces the likelihood of data loss when an error is encountered during the ingestion process.

In examples where the failure is caused by a management node of the management plane, the management plane reinitiates ingestion by providing, for a second time, the one or more event records to the selected data core using a second management node. In particular, the one or more event records is provided using a replicated copy of the data or copy of the one or more event records stored on the second management node (block 306). The data plane then stores the one or more event records in the selected data core.

In other examples where the failure is caused by the selected data core, the management plane reinitiates ingestion by selecting a second data core to ingest the data. The selection process is performed in a similar manner as described above at block 310. The selected second data core resides, for example, in the same data plane container as the originally selected data core or in a different data plane container as the originally selected data core. Using a copy of the data or copy of the one or more event records stored at the management plane (block 304 or 306), the management plane provides the one or more event records to the selected second data core, which causes the data plane to store the one or more event records in the selected second data core.

At block 316, a back-up copy of the one or more event records is stored in a back-up storage system (e.g., secondary storage system 240) separate from the data plane. The back-up storage system is, for example, external to the distributed-computing system. In some embodiments, a back-up process is triggered periodically for all data cores. The back-up process causes files of the data cores to be backed-up in the back-up storage system In some embodiments, the back-up process is triggered once a data core reaches capacity. For example, upon detecting that the selected data core storing the one or more event records is full, the data plane initiates the back-up process which causes a back-up copy of the selected data core (including the one or more event records) to be stored in the back-up storage system.

At block 318, the data is removed from the management plane. In some embodiments, after storing the back-up copy of the one or more event records in the back-up storage system, the data plane provides an indication to the management plane that the one or more event records have been backed-up. In response to detecting the indication, the management plane removes (e.g., deletes) the stored data and the replicated copies of the stored data (as well as copies of the one or more event records) from the one or more management nodes of the management plane. The data is removed from the management plane because redundant copies of the one or more event records have been created (e.g., in the data plane and in the back-up storage system). Removing the data from the management plane frees up memory in the management plane and enables the management plane to process and store subsequent ingestion data from the one or more data sources.

It should be recognized that, in some embodiments, multiple stored copies of the data being ingested are available at any given moment during process 300. For example, prior to the data being stored on the selected data core (block 314), multiple stored copies of the data are available at multiple management nodes. After the data is removed from the management nodes (block 318), multiple stored copies of the data (event records) are available at the selected data core and at the back-up storage system. Such redundancy enables reliable data ingestion and reduces the likelihood of data loss during data ingestion.

While process 300 is described above in the context of a distributed-computing system, it should be understood that, in some embodiments, process 300 can be performed using other computing systems. For example, process 300 can be performed using one or more server computers implementing a database platform. In particular, data received from one or more data sources can be ingested into one or more databases of the database platform implemented on the one or more server computers, in accordance with process 300.

In accordance with some implementations, a computer-readable storage medium (e.g., a non-transitory computer readable storage medium) is provided, the computer-readable storage medium storing one or more programs for execution by one or more processors of a computing system (e.g., distributed computing system), the one or more programs including instructions for performing any of the methods or processes described herein.

In accordance with some implementations, a computing system (e.g., distributed computing system) is provided that comprises means for performing any of the methods or processes described herein.

In accordance with some implementations, a computing system (e.g., distributed computing system) is provided that comprises one or more processing units configured to perform any of the methods or processes described herein.

In accordance with some implementations, a computing system (e.g., distributed computing system) is provided that comprises one or more processors and memory storing one or more programs for execution by the one or more processors, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for data ingestion by a distributed-computing system implementing a management plane and a data plane, the method comprising:
    at the management plane:
        receiving log data generated by one or more components of an information processing system external to the distributed-computing system;
        storing the log data at a management node of the management plane;
        selecting, from a plurality of data cores, a data core to ingest the log data, wherein the plurality of data cores are stored across one or more data plane containers of the data plane;
        processing the log data to generate one or more event records corresponding to one or more log events that occurred at the information processing system; and
        sending the one or more event records to the selected data core, wherein the sending causes the data plane to store the one or more event records in the selected data core, wherein the log data received from the information processing system includes time stamps indicating a time at which each of the one or more log events occurred at the information processing system.

2. The method of claim 1, further comprising:
    receiving, at the management plane, an ingestion request with the log data, wherein the log data is a payload of the ingestion request.

3. The method of claim 2, wherein the data core is selected using information included in the received ingestion request.

4. The method of claim 1, wherein the log data is received from an agent of the information processing system, the method further comprising:
    replicating the log data across a plurality of separate management nodes of the management plane, including storing the replicated log data at the plurality of separate management nodes; and
    upon replicating the log data across the plurality of separate management nodes, sending, by the management plane, a confirmation to the agent indicating that the log data has been accepted.

5. The method of claim 4, wherein the confirmation is sent to the agent prior to or while the one or more event records are being stored in the selected data core.

6. The method of claim 1, further comprising:
    at the management plane:
        detecting a failure to store the one or more event records in the selected data core;
        in response to detecting the failure, selecting, from the plurality of data cores, a second data core to ingest the log data; and
        sending the one or more event records to the selected second data core, including causing the data plane to store the one or more event records in the selected second data core.

7. The method of claim 1, further comprising:
    storing a back-up copy of the one or more event records in a back-up storage system external to the distributed-computing system; and
    after storing the one or more event records in the selected data core and storing the back-up copy in the back-up storage system, removing the log data from the management plane.

8. The method of claim 1, wherein the data core is selected using metadata obtained from the data plane.

9. The method of claim 8, wherein, for each respective data core of the plurality of data cores, the metadata includes information regarding available storage capacity of the respective data core, current availability of the respective data core for ingesting log data, or ingestion processing capacity of a data plane container storing the respective data core.

10. The method of claim 1, wherein the selected data core is stored in a first data plane container of the one or more data plane containers, and wherein selecting the data core further comprises:
    determining, by the management plane, a current data ingestion rate of the first data plane container relative to one or more other data plane containers of the data plane, wherein the data core is selected based on the determined current data ingestion rate of the first data plane container relative to the one or more other data plane containers.

11. The method of claim 1, wherein processing the log data further comprises:
    decompressing the log data; and
    parsing the decompressed log data to generate the one or more event records.

12. The method of claim 11, wherein:
    parsing the decompressed data further comprises extracting, from the decompressed data, one or more fields for the one or more event records; and
    causing the data plane to store the one or more event records in the selected data core further comprises causing the data plane to store the one or more fields in an index of the selected data core, the one or more fields stored in association with the one or more event records.

13. The method of claim 1, further comprising:
replicating the one or more event records across one or more separate management nodes of the management plane, including storing the replicated one or more event records on the one or more separate management nodes.

14. A non-transitory computer-readable storage medium storing one or more programs configured to be executed by one or more processors of a distributed-computing system, the distributed-computing system implementing a management plane and a data plane, the one or more programs including instructions for:
processing log data received from one or more data sources, wherein the log data is generated by one or more components of an information processing system external to the distributed-computing system;
storing the log data at a management node of the management plane;
selecting, from a plurality of data cores, a data core to ingest the log data, wherein the plurality of data cores are stored across one or more data plane containers of the data plane;
processing the log data to generate one or more event records corresponding to one or more log events that occurred at the information processing system; and
providing the one or more event records to the selected data core, wherein the providing causes the data plane to store the one or more event records in the selected data core wherein the log data received from the information processing system includes time stamps indicating a time at which each of the one or more log events occurred at the information processing system.

15. The computer-readable storage medium of claim 14, wherein the log data is received from an agent of the information processing system, and wherein the one or more programs further include instructions for:
replicating the log data across one or more separate management nodes of the management plane, including storing the replicated log data at the one or more separate management nodes; and
upon replicating the log data across the one or more separate management nodes, providing, by the management plane, a confirmation to the agent indicating that the data has been accepted.

16. The computer-readable storage medium of claim 14, wherein the one or more programs further include instructions for:
detecting, by the management plane, a failure to store the one or more event records in the selected core;
in response to detecting the failure, selecting, from the plurality of data cores, a second data core to ingest the log data; and
providing the one or more event records to the selected second data core, including causing the data plane to store the one or more event records in the selected second data core.

17. The computer-readable storage medium of claim 14, wherein the one or more programs further include instructions for:
storing a back-up copy of the one or more event records in a back-up storage system external to the distributed-computing system; and
after storing the one or more event records in the selected data core and storing the back-up copy in the back-up storage system, removing the log data from the management plane.

18. A distributed-computing system for data ingestion, wherein the distributed-computing system implements a management plane and a data plane, the distributed-computing system comprising:
one or more processors; and
memory storing one or more programs configured to be executed by the one or more processors, the one or more programs including instructions for:
processing log data received from one or more data sources, the log data generated by one or more components of an information processing system external to the distributed-computing system;
storing the data at a management node of the management plane;
selecting, from a plurality of data cores, a data core to ingest the log data, wherein the plurality of data cores are stored across one or more data plane containers of the data plane;
processing the log data to generate one or more event records corresponding to one or more log events that occurred at the information processing system; and
providing the one or more event records to the selected data core, wherein the providing causes the data plane to store the one or more event records in the selected data core wherein the log data received from the information processing system includes time stamps indicating a time at which each of the one or more log events occurred at the information processing system.

19. The distributed-computing system of claim 18, wherein the log data is received from an agent of the information processing system, and wherein the one or more programs further include instructions for:
replicating the log data across one or more separate management nodes of the management plane, including storing the replicated log data at the one or more separate management nodes; and
upon replicating the log data across the one or more separate management nodes, providing, by the management plane, a confirmation to the agent indicating that the log data has been accepted.

20. The distributed-computing system of claim 18, wherein the one or more programs further include instructions for:
detecting, by the management plane, a failure to store the one or more event records in the selected core;
in response to detecting the failure, selecting, from the plurality of data cores, a second data core to ingest the log data; and
providing the one or more event records to the selected second data core, including causing the data plane to store the one or more event records in the selected second data core.

21. The distributed-computing system of claim 18, wherein the one or more programs further include instructions for:
storing a back-up copy of the one or more event records in a back-up storage system external to the distributed-computing system; and
after storing the one or more event records in the selected data core and storing the back-up copy in the back-up storage system, removing the log data from the management plane.

* * * * *